US010745495B2

(12) United States Patent
Hamed et al.

(10) Patent No.: US 10,745,495 B2
(45) Date of Patent: Aug. 18, 2020

(54) GAS PHASE POLYMERISATION OF ETHYLENE

(71) Applicant: SABIC Global Technologies B.V., Bergen op Zoom (NL)

(72) Inventors: Orass Hamed, Riyadh (SA); Vugar Aliyev, Riyadh (SA); Omar Al-Sayari, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 158 days.

(21) Appl. No.: 16/070,536

(22) PCT Filed: Jan. 19, 2017

(86) PCT No.: PCT/EP2017/051021
§ 371 (c)(1),
(2) Date: Jul. 17, 2018

(87) PCT Pub. No.: WO2017/125460
PCT Pub. Date: Jul. 27, 2017

(65) Prior Publication Data
US 2019/0016831 A1    Jan. 17, 2019

Related U.S. Application Data

(60) Provisional application No. 62/405,316, filed on Oct. 7, 2016.

(30) Foreign Application Priority Data

Jan. 21, 2016    (EP) .................................... 16152248

(51) Int. Cl.
*C08F 2/34* (2006.01)
*C08F 110/02* (2006.01)
*C08F 4/02* (2006.01)
*C08F 4/69* (2006.01)
*C08F 4/642* (2006.01)

(52) U.S. Cl.
CPC ................ *C08F 2/34* (2013.01); *C08F 4/025* (2013.01); *C08F 4/6423* (2013.01); *C08F 4/69* (2013.01);
(Continued)

(58) Field of Classification Search
CPC .. C08F 2/34; C08F 4/24; C08F 110/02; C08F 4/025; C08F 4/69; C08F 4/6423;
(Continued)

(56) References Cited

FOREIGN PATENT DOCUMENTS

EP          1845111 A1 * 10/2007 ................ C08F 4/76
WO     2012045426 A1    4/2012
(Continued)

OTHER PUBLICATIONS

Gregg, S.J. et al., "Adsorption, Surface area and porosity", Academic Press, London, 1982, 313 pages.
(Continued)

*Primary Examiner* — Robert D Harlan
(74) *Attorney, Agent, or Firm* — Cantor Colburn LLP

(57) ABSTRACT

The invention relates to a process for the production of polyethylene by gas phase polymerisation of ethylene in the presence of a supported chromium oxide based catalyst which is modified with an amino alcohol wherein the molar ratio of amino alcohol:chromium ranges between 0.5:1 and 1.5:1 wherein the support is silica having a surface area (SA) between 250 m2/g and 400 m2/g and a pore volume (PV) between 1.1 cm3/g and less than 2.0 cm3/g.

9 Claims, 1 Drawing Sheet

(52) U.S. Cl.
CPC ........ *C08F 110/02* (2013.01); *C08F 2410/04* (2013.01); *C08F 2500/04* (2013.01); *C08F 2500/07* (2013.01); *C08F 2500/12* (2013.01); *C08F 2500/18* (2013.01)

(58) Field of Classification Search
CPC .............. C08F 2500/07; C08F 2410/04; C08F 2500/08; C08F 2500/12; C08F 2500/04
See application file for complete search history.

(56) References Cited

FOREIGN PATENT DOCUMENTS

| WO | WO-2012045426 A1 * | 4/2012 | ............ C08F 110/02 |
|----|-------------------|--------|--------------------------|
| WO | 2013186214 A1 | 12/2013 | |
| WO | WO-2013186214 A1 * | 12/2013 | ............ C08F 110/02 |

OTHER PUBLICATIONS

International Search Report for international Application No. PCT/EP2017/051021; dated Mar. 2, 2017; 5 pages.
Lowell, J., "Introduction to Poweder Surface Areaa", J.Wiley & Sons, 1979.
McDaniel; "Supported Chromium Catalysts for Ethylene Polymerization"; Advances in Catalysis; vol. 33; 1985; pp. 47-98.
Peacock, Andrew J., "Handbook of Polyethylene", Chapter 3 Production Processes, 2000, Marcel Dekker, Inc., New York; ISBN 0824795466; p. 43-66.
Written Opinion of the International Search Report for International Application No. PCT/EP2017/051021; dated Mar. 2, 2017; 6 pages.

* cited by examiner

Figure 2                                                                 Figure 3

GAS PHASE POLYMERISATION OF ETHYLENE

CROSS REFERENCE TO RELATED APPLICATIONS

This application is a 371 of International Application No. PCT/EP2017/051021, filed Jan. 19, 2017, which claims priority to EP Application Serial No. 16152248.7, filed Jan. 21, 2016, and U.S. Provisional Application No. 62/405,316, filed Oct. 7, 2016, which are incorporated herein by reference in their entirety.

The present invention relates to a process for the gas phase polymerisation of ethylene in the presence of a supported chromium oxide based catalyst.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include gas phase processes.

The chromium oxide based catalyst, which is commonly referred to in the literature as "the Phillips catalyst", can be obtained by calcining a chromium compound carried on an inorganic oxide carrier in a non-reducing atmosphere. The chromium oxide catalysis and the ethylene polymerisation with this specific catalyst are disclosed in "Handbook of Polyethylene" by Andrew Peacock at pages 61-64.

WO2012045426 discloses a process wherein high density ethylene polymer is obtained by polymerizing ethylene in the presence of a supported chromium oxide based catalyst which is modified with an organic compound comprising an oxygen and a nitrogen atom. The chromium oxide based catalyst contains a silica support wherein the silica may have a surface area of 300 m$^2$/g and a pore volume of 1.5 cm$^3$/g.

There is an ongoing need to increase the catalyst activity of the catalysts applied in the gas phase process for the manufacturing of high density polyethylene.

The present invention provides a process wherein high density ethylene polymer is obtained by polymerizing of ethylene in the presence of a silica supported chromium oxide based catalyst composition which is modified with an amino alcohol wherein the molar ratio of amino alcohol:chromium ranges between 0.5:1 and 1.5:1, wherein silica has a surface area (SA) between ≥450 m$^2$/g and 5550 m$^2$/g and a pore volume (PV) between ≥1.7 cm$^3$/g and ≤2.0 cm$^3$/g and wherein the catalyst comprises a titanium compound.

According to a preferred embodiment the invention the amount of chromium in the supported catalyst is ≥0.1% by weight and ≤0.5% by weight.

The amino alcohol has the formula:

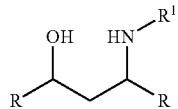

wherein
the R groups may be, independently of one other the same or different, a C$_1$-C$_{10}$ alkyl group and R$^1$ is a C$_3$-C$_8$ cycloalkyl group or C$_4$-C$_{16}$ alkyl substituted cycloalkyl group, According to a preferred embodiment of the invention the amino alcohol is 4-(cyclohexylamino) pentan-2-ol or 4-[(2-methylcyclohexyl) amino]pentan-2-ol.

The use of the catalyst with the silica support having surface area and pore volume silica having a surface area between ≥450 m$^2$/g and ≤550 m$^2$/g and a pore volume between ≥1.7 cm$^3$/g and less than ≤2.0 cm$^3$/g and an amount of chromium between ≥0.1% by weight and ≤0.5% by weight resulted in an increase of the catalyst activity, bulk density of the resin and the molecular weight of the produced resin. Furthermore the obtained polymer has an improved morphology.

The surface area and pore volume of the supports can be determined by the BET nitrogen adsorption method. Test Method: ASTM D 1993-03 (2013) Standard Test Method for Precipitated Silica-Surface Area by Multipoint BET Nitrogen Adsorption. See also references "Adsorption, Surface Area and Porosity" by S. J. Gregg and K. S. W. Sing, Academic Press, London (1982) and "Introduction to Powder Surface Area" by S. Lowell, J. Wiley & Sons, New York, N.Y., (1979).

The polyethylene powder obtained with the process according to the present invention has:
- a high-load melt index (HLMI)≥5 g/10 min and ≤10 g/10 min (according to ISO 1133)
- M$_w$/M$_n$≥20. and ≤30 (according to size exclusion chromatography (SEC) measurement)
- a density ≥945 kg/m$^3$ and ≤965.kg/m$^3$ (according to ISO1183).

In the case that the molar ratio of amino alcohol:chromium is outside the claimed range the desired results are not obtained.

According to a preferred embodiment of the invention the molar ratio of amino alcohol:chromium ranges between 0.7:1 and 1.5:1.

More preferably the molar ratio of amino alcohol:chromium ranges between 1:1 and 1.3:1. In this range the effect of increasing molecular weight and broadening molecular weight distribution is optimal.

In case the pore volume is higher than 2.0 cm$^3$/g the upper fluidised bulk density of the resin the gas phase process is reduced which forces to reduce the super gas velocity otherwise the resin will carryover and result in fouling of the reactor. The reduction of the super gas velocity results in a reduction of the production rate.

The titanium content of the catalyst may range between 0.1 and 10% by weight, preferably in the range between 0.1 and 6% by weight.

The titanium compound may be a compound according to the formulas Ti(OR$^1$)$_n$X$_{4-n}$ and Ti(R$^2$)$_n$X$_{4-n}$, wherein
R$^1$ and R$^2$ represent an (C$_1$-C$_{20}$) alkyl group, (C$_1$-C$_{20}$) aryl group or (C$_1$-C$_{20}$) cycloalkyl group,
X represents a halogen atom, preferably chlorine, and
n represents a number satisfying 0≥n≤4.

Examples of suitable titanium compounds include titanium alkoxy compounds for example tetraethoxy titanium, tetramethoxy titanium, tetrabutoxy titanium, tetrapropoxy titanium, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride. Preferably titanium tetraisopropoxide is applied.

The weight ratio Cr:Ti may range for example between 1:2 and 1:4.

The presence of titanium may increase the activity of the catalyst, first by shortening the induction time, and then by allowing higher polymerization rates. Furthermore the presence of titanium may result in broadening the polymer molecular weight distribution (MWD) which increases the melt index which can be useful in for example blow moulding applications.

More preferably the amount of chromium is at least 0.2% by weight, more preferably at least 0.3% by weight. Preferably the amount of chromium in the supported catalyst ranges between 0.3 and 0.5% by weight.

In the case of the production of an ethylene copolymer the alpha olefin co monomer may be selected from propylene, 1-butene, 1-pentene, 4-methyl-1-pentene, 1-hexene and/or 1-octene.

Preferably the commoner is 1-hexene.

Ethylene compositions comprising the ethylene polymers obtained with the process according to the invention may also comprise additives for example lubricants, fillers, stabilisers, antioxidants, compatibilizers and pigments. The additives used to stabilize the polymers may be, for example, additive packages including hindered phenols, phosphites, UV stabilisers, antistatics and stearates.

Ethylene polymers may be extruded or blow-moulded into articles such as for example pipes, bottles, containers, fuel tanks and drums, and may be extruded or blown into films. According to a preferred embodiment of the present invention the ethylene polymer is applied to produce bottles or containers via a blow moulding process.

According to a preferred embodiment of the invention the polymer obtained with the process according to the invention is applied in the production of blow moulded containers with a volume ≥20 litres, ferry cans and IBC (intermediate bulk containers).

The nature of the silica support, the chromium loading, and the activation method can all influence the chemical state of the supported chromium and performance of the chromium oxide on silica catalyst in the polymerization process. For example, the activity of the catalysts generally increases with an increase in the activation temperature, while the molar mass of the polymerization product may decrease or the HLMI (High Load Melt Index) may increase. The influence of the activation conditions on the catalyst properties is disclosed in Advances in Catalysis, Mc Daniel, Vol. 33, 48-98, 1985. Generally the activation takes place at an elevated temperature, for example, at a temperature above 450° C., preferably from 450 to 850° C. The activation may take place in different atmosphere, for example in dry air. Generally, the activation takes place at least partially under an inert atmosphere preferably consisting of nitrogen. The activation time after reaching the maximum temperature may last for several minutes to several hours. This activation time is at least 1 hour but it may be advantageous to activate much longer. Depending on the specific application requirements, chromium oxide catalyst can be activated at different temperatures and time periods before contacting with the amino alcohol according to the invention. For example, for blow moulded IBCs (Intermediate Bulk Containers) the catalyst activation temperature ranges preferably between 538 and 705° C. For blow moulded HICs (Household Industrial Containers) the catalyst activation temperatures are preferably in the range between 600 and 850° C.

The invention will be elucidated by means of the following non-limiting examples.

EXAMPLES

Example I

Catalyst I

To a 3 L three-necked round bottom flask, equipped with a condenser and a mechanical stirrer 200 g of silica average particle size of 35 micrometres, a pore volume of 1.85 ml/g and a surface area of 490 m2/g dried at 200° C. for 3 hours. 4.3 g of Chromium acetate hydroxide were added to the silica then slurried in 250 cm$^3$ of Methanol (100%), which was stirred at 70° C. for 30 minutes. After wards drying ethanol solvent took place at 85° C. with nitrogen purge. The dried chromium salt on silica powder was cooled down to room temperature then slurried with 250 cm$^3$ of iso-pentane, to be followed by the addition of 39 cm$^3$ of 100% Ti(OC$_2$H$_5$)$_4$ (tetra ethoxy titanium) which was allowed to mix for 30 minutes at 45° C. then drying the solvent at 75° C. with nitrogen purge. For the chromium catalyst activation the dried catalyst powder was placed in the calciner and the following sequence was followed:

Ramp from ambient to 150° C. in 3 hours under N2 flow then hold for 10 minutes
Ramp from 150° C. to 450° C. in 3 hours
At 450° C. switch from N$_2$ to O$_2$ flow
Ramp from 450° C. to 759° C. in 3 hours under O$_2$
Hold at 759° C. for 3 hours
Cool to room temperature then switch to N2 purge.
Elemental analysis: 0.35 wt % Cr and 2.9 wt % Ti Catalyst II Catalyst I Treated with 4-(cyclohexylamino) pentan-2-ol 5 grams of previously activated catalyst was placed in a 40 cm$^3$ flask. 30 cm$^3$ of isopentane was added to slurry the activated catalyst, then a 0.1M isopentane solution of 2-(cyclohexylamino)-4-pentanol was added to the flask and the resultant mixture agitated. It then stood for 60 minutes at a temperature of 50° C. The slurry was dried under vacuum or using a nitrogen purge at a temperature of 50° C. The modified catalyst was stored under nitrogen until use. The catalyst was pale green in color. The mole ratio of 4-(cyclohexylamino) pentan-2-ol to chromium was calculated to be 1.2:1.

Comparative Example A

Catalyst A

To a three-necked round bottom flask, equipped with a condenser and a mechanical stirrer 200 g of dried silica with 0.5% Cr average particle size of 45 micrometres, a pore volume of 1.5 ml/g and a surface area of 300 m$^2$/g at 200° C. slurried with 250 cm$^3$ of iso-pentane, to be followed by the addition of 65 cm$^3$ of tetraethoxy titanium Ti(OC$_2$H$_5$)$_4$ (100%). The contents were mixed at 35° C. for another 60 minutes followed by drying the solvent at 85° C. with nitrogen purge. For the chrome catalyst activation the dried catalyst powder was placed in the calciner and was activated in air at 825° C. for 4 hours.

Elemental analysis: 0.5 wt % Cr and 3.8 wt % Ti

Catalyst B (According to WO2012045426):

Catalyst a Treated with 4-(cyclohexylamino) pentan-2-ol 5 grams of previously activated catalyst was placed in a 40 cm$^3$ flask. 30 cm$^3$ of isopentane was added to slurry the activated catalyst, then a 0.1M isopentane solution of 4-(cyclohexylamino)pentan-2-ol was added to the flask and the resultant mixture agitated. It then stood for 60 minutes at a temperature of 50° C. The slurry was dried under vacuum or using a nitrogen purge at a temperature of 50° C. The modified catalyst was stored under nitrogen until use. The catalyst was pale green in color. The mole ratio of 2-(cyclohexylamino)-4-pentanol to chromium was calculated to be 1.2:1.

Example II

Ethylene Polymerisation

An autoclave with a volume of 2 liters was purged with nitrogen at 150° C. for 30 minutes. After cooling the autoclave to 90° C., one liter of isopentane was introduced to the reactor and then the reactor was pressurized up to 20 bar with ethylene. Then 0.1 ml of TEAL solution (1M) was injected into the reactor to scavenge the impurities, followed by 0.20 g of the solid Catalyst II after being slurried in 20 cm$^3$ of isopentane. The reactor temperature was raised to 100° C. Ethylene polymerization was carried out for 1 hour, with ethylene supplied on demand to maintain the total reactor pressure at 20 bars. Upon completion of the polymerization, the reactor was vented and cooled to ambient temperature to recover the polymer.

346 grams of polyethylene were recovered giving a catalyst productivity of 1,730 g PE/g cat h at 200 psig.

The characteristics of the obtained polyethylene:
weight average molecular weight: 325,000
number average molecular weight: 13,000
molecular weight distribution: 25
resin bulk density: 460 kg/m$^3$.

Comparative Example B

Ethylene Polymerisation

An autoclave with a volume of 2 liters was purged with nitrogen at 150° C. for 30 minutes. After cooling the autoclave to 90° C., one liter of isopentane was introduced to the reactor and then the reactor was pressurized up to 20 bar with ethylene. Then 0.1 ml of TEAL solution (1 M) was injected into the reactor to scavenge the impurities, followed by 0.20 g of the solid Comparative Catalyst B after being slurried in 20 cm$^3$ of isopentane. The reactor temperature was raised to 100° C. Ethylene polymerization was carried out for 1 hour, with ethylene supplied on demand to maintain the total reactor pressure at 20 bars. Upon completion of the polymerization, the reactor was vented and cooled to ambient temperature to recover the polymer.

232 grams of polyethylene were recovered giving a catalyst productivity of 1,160 g PE/g cat h at 200 psig.

The characteristics of the obtained polyethylene:
weight average molecular weight: 265,000
number average molecular weight: 12,045
molecular weight distribution: 22
resin bulk density: 350 kg/m$^3$.

FIG. 2 and FIG. 3 show the polymer obtained with the catalyst II (different magnifications).

Figure 1:
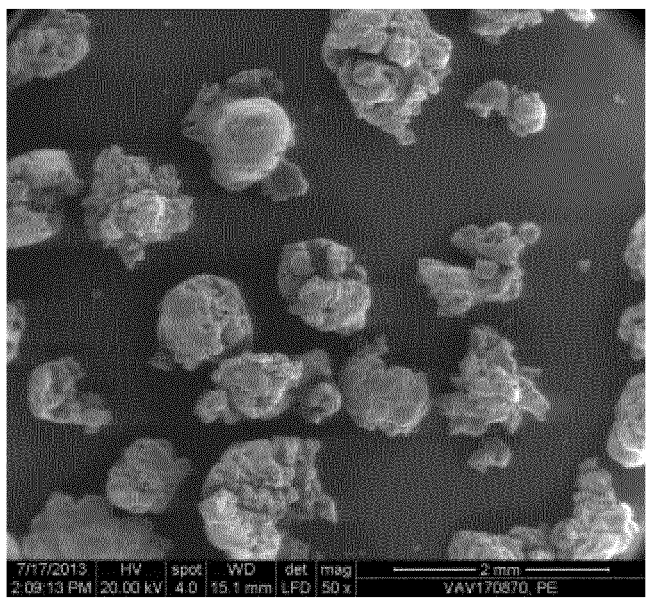
FIG. 1 shows the polymer obtained with the comparative catalyst B.
Figure 1:
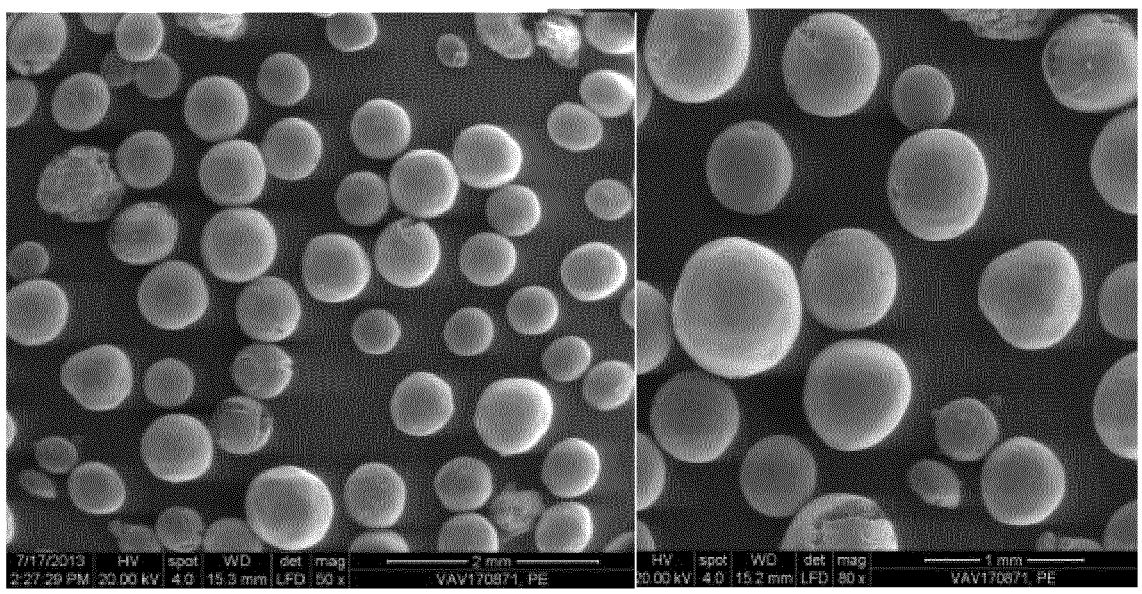

The invention claimed is:

1. A process for the production of polyethylene by gas phase polymerisation of ethylene in the presence of a supported chromium oxide based catalyst composition which is modified with an amino alcohol wherein the molar ratio of amino alcohol: chromium ranges between 0.5:1 and 1.5:1, wherein the support is silica having a surface area (SA) between ≥450 m$^2$/g and ≤550 m$^2$/g and a pore volume (PV) between ≥1.7 cm$^3$/g and ≤2.0 cm$^3$/g and wherein the catalyst comprises a titanium compound.

2. The process according to claim 1 characterised in that the amount of chromium in the supported catalyst is ≥0.1% by weight and ≤0.5% by weight.

3. The process according to claim 1, characterised in that the molar ratio of amino alcohol:chromium ranges between 0.7:1 and 1.5:1.

4. The process according to claim 1, characterised in that the molar ratio of amino alcohol:chromium ranges between 1:1 and 1.3:1.

5. The process according to claim 1, characterised in that the amino alcohol has the formula

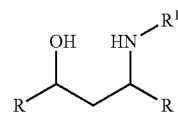

wherein
the R groups may be, independently of one other the same or different, a $C_1$-$C_{10}$ alkyl group, and
$R^1$ is a $C_3$-$C_8$ cycloalkyl group or a $C_4$-$C_{16}$ alkyl substituted cycloalkyl group.

6. The process according to claim 5 characterised in that the amino alcohol is 4-(cyclohexylamino) pentan-2-ol or 4-[(2-methylcyclohexyl) amino]pentan-2-ol.

7. The process according to claim 1, characterised in that the titanium compound a compound according to the formulas Ti(OR$^1$)$_n$X$_{4-n}$ and Ti(R$^2$)$_n$X$_{4-n}$, wherein
$R^1$ and $R^2$ represent an ($C_1$-$C_{20}$) alkyl group, ($C_1$-$C_{20}$) aryl group or ($C_1$-$C_{20}$) cycloalkyl group,
X represents a halogen atom, and
n represents a number satisfying 0≥n≤4.

8. The process according to claim 1 characterised in that
the amount of chromium in the supported catalyst is ≥0.1% by weight and ≤0.5% by weight,
the molar ratio of amino alcohol:chromium ranges between 1:1 and 1.3:1, and
the amino alcohol has the formula

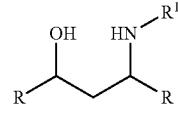

wherein
the R groups may be, independently of one other the same or different, a $C_1$-$C_{10}$ alkyl group, and
$R^1$ is a $C_3$-$C_8$ cycloalkyl group or a $C_4$-$C_{16}$ alkyl substituted cycloalkyl group.

9. The process according to claim 8 characterised in that the titanium compound is a compound according to the formulas Ti(OR$^1$)$_n$X$_{4-n}$ and Ti(R$^2$)$_n$X$_{4-n}$, wherein
$R^1$ and $R^2$ represent an ($C_1$-$C_{20}$) alkyl group, ($C_1$-$C_{20}$) aryl group or ($C_1$-$C_{20}$) cycloalkyl group,
X represents a halogen atom, and
n represents a number satisfying 0≥n≤4.

* * * * *